April 26, 1966  W. A. RAY  3,247,868
FLUID CONTROL MEANS
Filed July 13, 1962  4 Sheets-Sheet 4
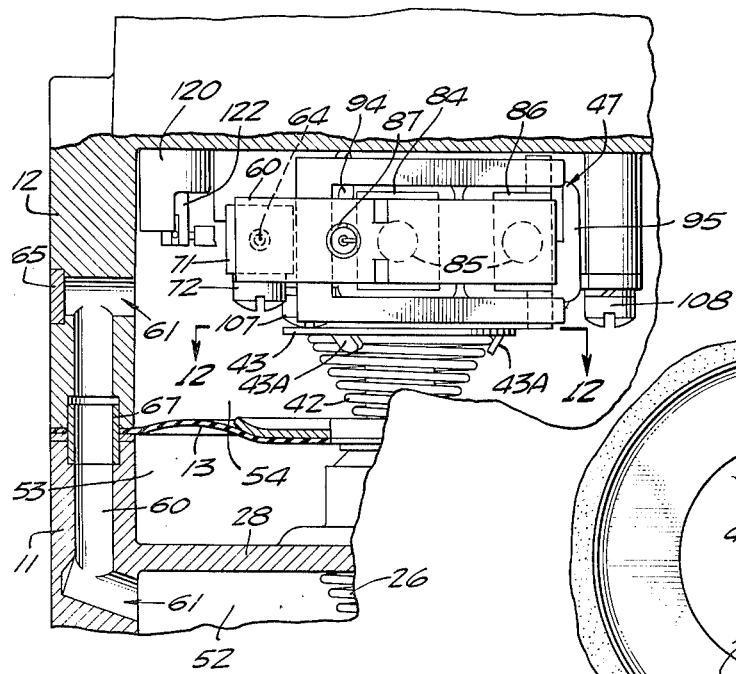
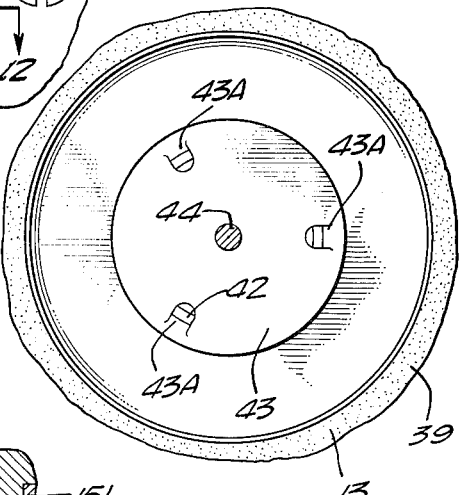
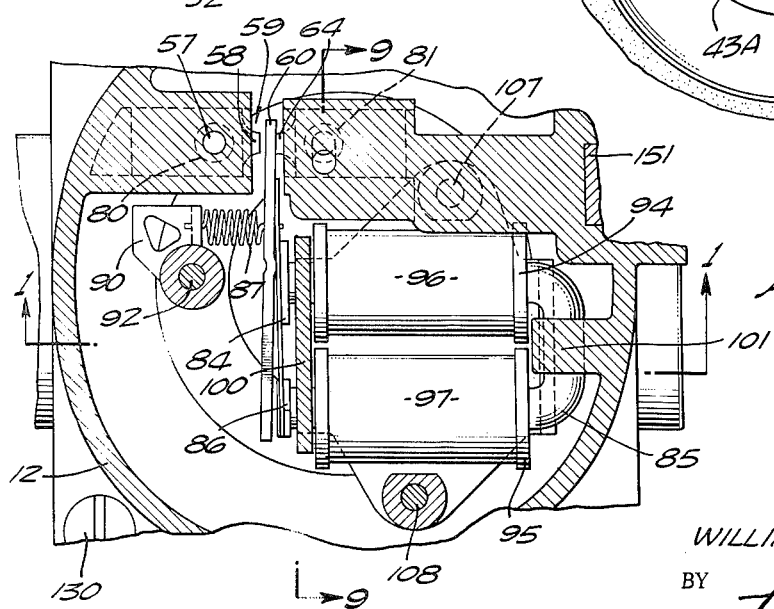
INVENTOR.
WILLIAM A. RAY
BY Lyon & Lyon
ATTORNEYS

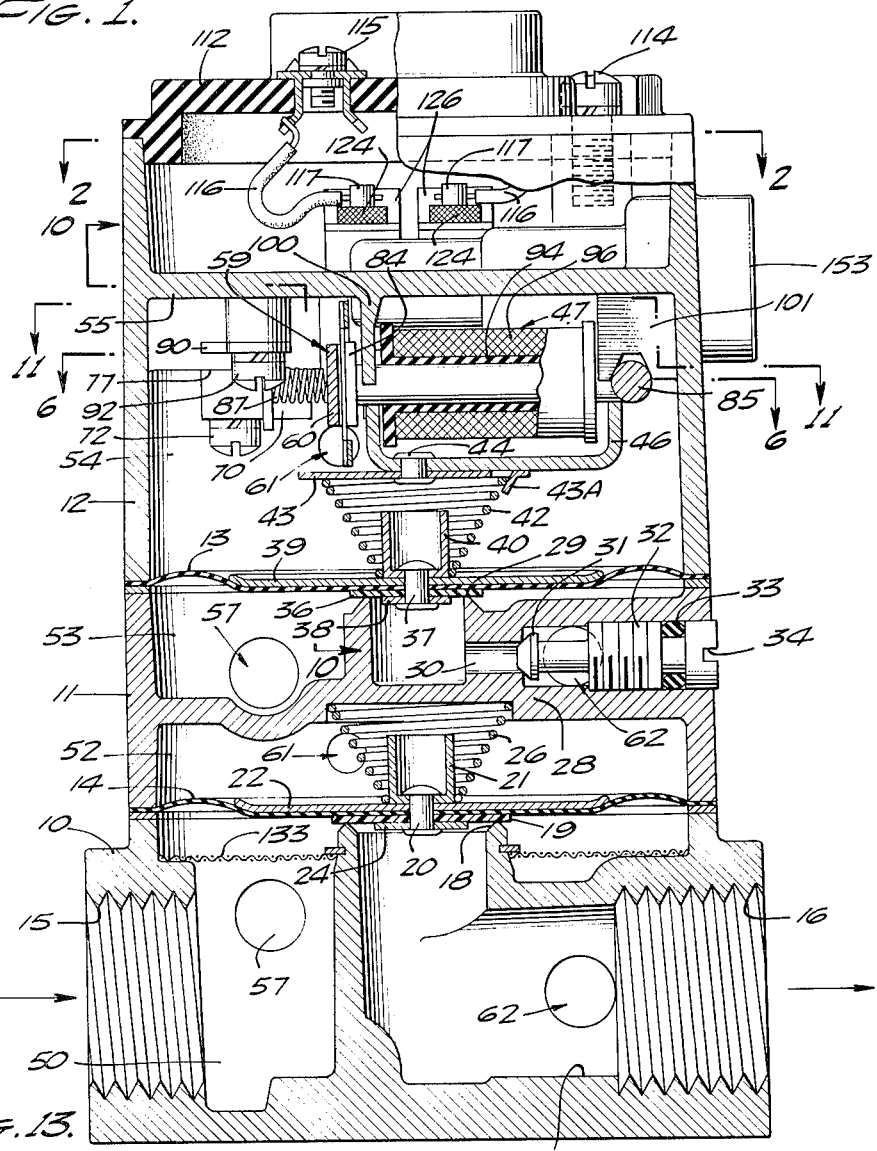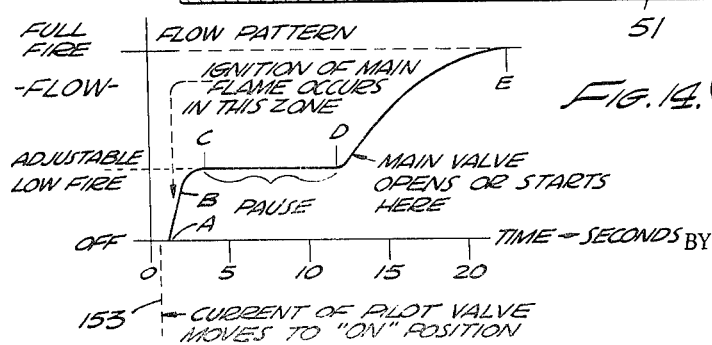

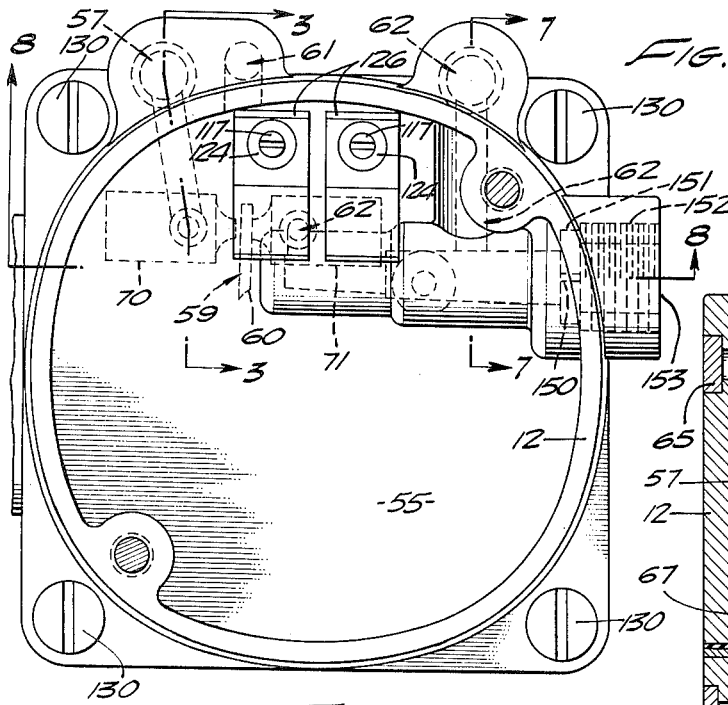

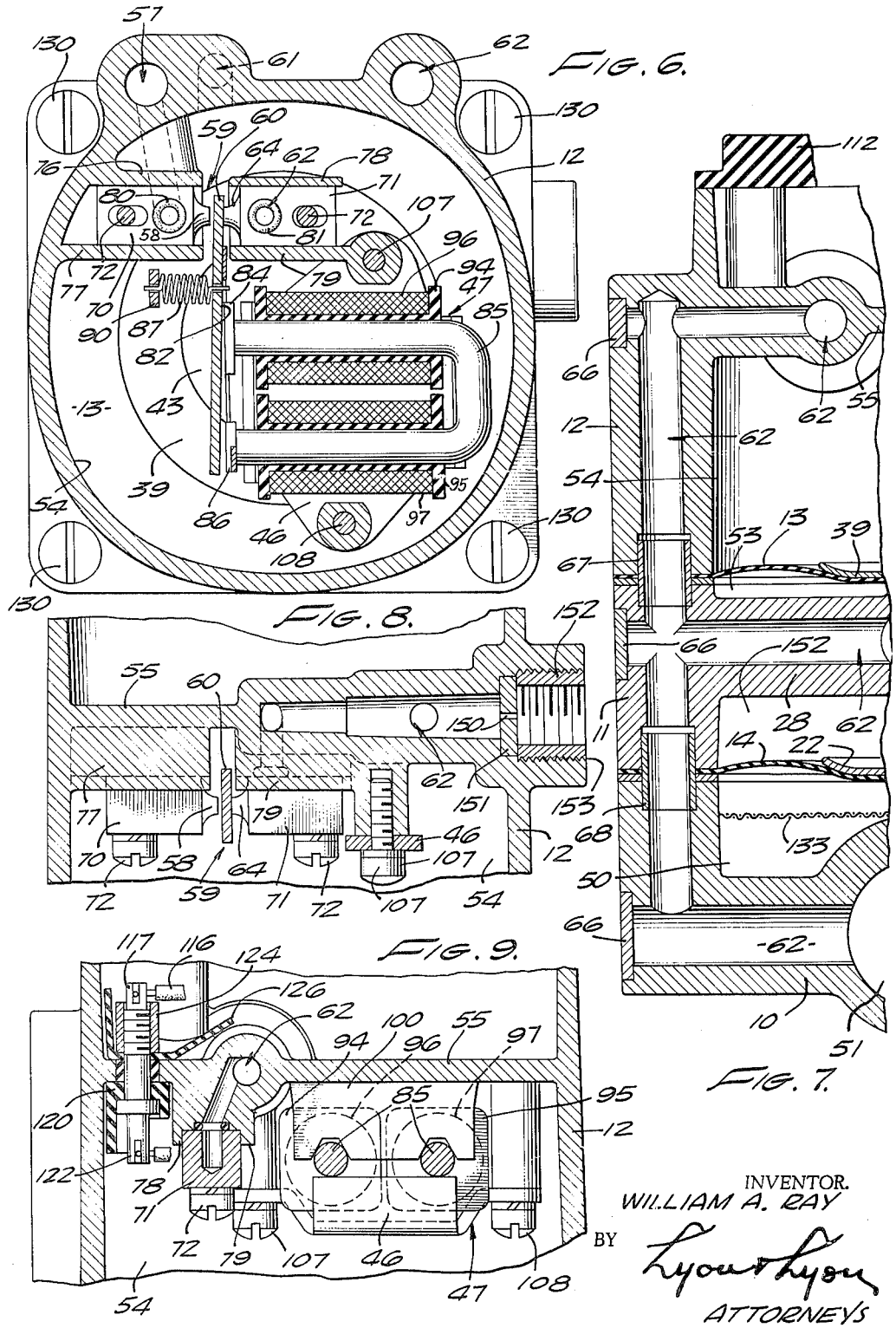

United States Patent Office 3,247,868
Patented Apr. 26, 1966

3,247,868
FLUID CONTROL MEANS
William A. Ray, North Hollywood, Calif., assignor to International Telephone and Telegraph Corporation, Baltimore, Md., a corporation of Maryland
Filed July 13, 1962, Ser. No. 209,545
13 Claims. (Cl. 137—628)

The present invention relates to improved means and techniques for controlling the flow of fluids and is particularly useful in the control of fuel such as gas to heating apparatus.

As disclosed herein, the apparatus involves a multipart casing having a gas inlet and a gas outlet. Mounted within such casing are a pair of diaphragm valves which are effectively connected in parallel flow relationship between the inlet and outlet and such diaphragm valves are actuated by gas pressure which is controlled for that purpose by a three-way pilot valve, such pilot valve being operated by an electromagnet to which current is supplied in response to a condition such as, for example, a condition requiring the flow of gas through the control to a main gas burner. Upon operation of such pilot valve, i.e. energization thereof, the diaphragm valves are actuated by gas pressure in sequence, one of such diaphragm valves opening to establish a so-called "low fire" condition, after which the other diaphragm valve is opened to establish a so-called "high-fire" condition. For that reason, such one diaphragm valve is termed the low fire valve and the other diaphragm valve is termed the high fire valve, with the understanding that in the high fire condition both diaphragm valves are open. For purposes of adjusting the low fire condition, such casing incorporates adjustable means whereby the flow of gas through the low fire valve may be adjusted.

Using this construction, the size of the low fire at the main burner is adjustable to match the requirements of heater and/or burner size, type of fuel gas, and burner or combustion chamber characteristics, and after establishment of the low fire condition, the high fire valve opens slowly to its full fire position. Subsequently, when the electromagnetic pilot valve is de-energized, both the low fire valve and high fire valve close reasonably quickly to avoid undesirable conditions incidental to gas turn-off, the pilot valve being effective for that purpose to control the admission or release of gas to one side of such diaphragm valves.

It is therefore a general object of the present invention to provide a control operating to accomplish the results indicated above.

A specific object of the present invention is to provide an improved control of this character in which there is a time interval or pause between establishment of the low fire condition and the subsequent establishment of the high fire condition.

Another specific object of the present invention is to provide a control of this character in which two diaphragm valves, effectively connected in parallel flow relationship between an inlet and an outlet, are operated in sequence.

Another specific object of the present invention is to provide a control of this character in which both diaphragm valves are both closed relatively quickly when it is desired to shut off the flow of fuel to the main burner.

Another specific object of the present invention is to provide a control of this character in which the low fire condition may be adjusted.

Another specific object of the present invention is to provide a control of this character in which two diaphragm valves are operated sequentially.

Another specific object of the present invention is to provide a control of this character in which the low fire condition is established relatively quickly without significant throttling of the incoming gas, thereby obviating either delayed ignition with attendant puff-back (minor explosion) or the condition where the gas does not ignite or carry over from one main burner part to another in accomplishing delayed ignition.

Another specific object of the present invention is to provide a control of this character wherein a low fire condition is initially established to prevent so-called "roll-out" arising from the fact that some furnaces cannot initially handle a high fire condition, in which case a gas flame may roll out of the furnace and burn on front of the furnace in a room. This latter undesirable condition may arise in particular, on first daily start-up of the furnace when the stacks or chimneys of the furnace are cold and insufficient draft conditions are present to handle products of combustion. By delaying the opening time of the full fire condition, the low fire condition provides heat which is effective to initiate draft through the furnace, thereby minimizing or preventing subsequent roll-out.

Another specific object of the present invention is to provide means and techniques useful in diaphragm-operated valves whereby the diaphragm, instead of being round, is ovate to impart longer life to the diaphragm without hysteresis effects and at the same time increasing the effective area of the diaphragm.

The features of the present invention which are believed to be novel are set forth with particularity in the appended claims. This invention itself, both as to its organization and manner of operation together with further objects and advantages thereof, may be best understood by reference to the following description taken in connection with the accompanying drawings in which:

FIGURE 1 is substantially a cross section through a gas control embodying the present invention, the section being taken substantially on line 1—1 of FIGURE 11;

FIGURE 2 is a section taken on line 2—2 of FIGURE 1;

FIGURE 3 is a section taken on line 3—3 of FIGURE 2;

FIGURE 4 is a section taken on line 4—4 of FIGURE 3;

FIGURE 5 illustrates constructional features of the control shown in FIGURE 1;

FIGURE 6 is a section taken on line 6—6 of FIGURE 1;

FIGURES 7 and 8 are sections taken on lines 7—7 and 8—8, respectively, in FIGURE 2;

FIGURE 9 is a section taken on line 9—9 of FIGURE 11;

FIGURES 10 and 11 are sections taken on corresponding lines 10—10 and 11—11 in FIGURE 1;

FIGURE 12 is a section taken on line 12—12 in FIGURE 10;

FIGURE 13 is a graph illustrating establishment of the low fire and full fire conditions as they occur in timed relation after current is supplied to the control shown in the previous figures;

FIGURE 14 is a schematic representation of a typical control circuit.

Referring to FIGURE 1 of the drawings, the control has three casing parts 10, 11 and 12 suitably secured together with the low fire diaphragm 13 sandwiched between casing parts 11 and 12 and with the high fire diaphragm 14 sandwiched between casing parts 10 and 11.

The casing part 10 has a threaded inlet opening 15 and an aligned threaded outlet opening 16, between which there is an angled partition defining an annular valve seat 18 cooperating with its movable closure member 19 on diaphragm 14. This closure member 19 is secured on diaphragm 14 by a rivet 20 which extends in turn through the cup-shaped spring guide 21, diaphragm-backing disc 22, diaphragm 14, closure member 19 and washer 24. The closure member 19 is normally pressed against the seat 18 by a compression spring 26 having its smaller end bearing against backing plate 22 and its larger end retained in a circular recess in the partition 28 in casing 11.

This partition 28 is formed to provide an annular valve seat 29 in communication with a passageway 30 of smaller area with one end of which cooperates an adjustable tapered valve element 31 formed on the end of threaded plug 32 which is recessed to accommodate the sealing O-ring 33 and which is provided with a kerf 34 to provide a screwdriver adjustment whereby flow through the passageway 30 may be adjusted.

The valve seat 29 is normally closed by the resilient closure member 36 which is mounted on diaphragm 13 in like manner as previously described in connection with the mounting of closure member 19 on its diaphragm 14, there being provided for that purpose, the rivet 37, washer 38, closure member 36, diaphragm 13, diaphragm-backing plate 39 and the cup-shaped spring-retaining member 40. The closure member 36 is normally pressed into engagement with its seat 29 by the coil compression spring 42 having its smaller end bearing against the backing plate 39 and the other enlarged end thereof being retained by a plurality of tongue portions 43A of plate 43, such plate 43 being stationarily mounted by rivet 44 on the stationary coil assembly retaining plate 46 which serves to retain the coil assembly 47 as described later.

It will be seen from the foregoing that a plurality of gas chambers are provided and these may be enumerated as follows: the inlet chamber 50 in communication with inlet 15; the outlet chamber 51 in communication with outlet 16; a first diaphragm chamber 52 between diaphragm 14 and partition 28; a second diaphragm chamber 53 between partition 28 and diaphragm 13; a third diaphragm chamber 54 between diaphragm 13 and partition or wall 55 of casing part 12. Certain ones of these chambers are intercommunicated by passageways formed in the walls of the casing parts. One of such passageways which serves to intercommunicate inlet chamber 50 with diaphragm chamber 53 is illustrated in FIGURE 3 and has the general reference numeral 57. It will also be seen in FIGURES 3 and 4 that such passageway 57 is in communication with the port 58 (FIGURE 4) of a three-way valve 59 so that when the movable element 60 of such valve 59 is in its normal position shown in FIGURE 4, each of the three chambers 50, 53 and 54 are in communication with each other. A second passageway, which constantly intercommunicates chambers 52 and 54, is illustrated in FIGURE 10 and has the general reference numeral 61. A third passageway 62 (FIGURES 1 and 7) serves to intercommunicate the outlet chamber 51 with the downstream side of valve element 31, and such passageway 62 is extended, as shown in FIGURES 7, 8 and 4, to the other valve port 64 of the three-way valve 59 which has its movable valve element 60 closing such port 64 in the normal position of the valve element 60 as illustrated in FIGURE 4. These three passageways may be formed in the walls of the casing members typically, as illustrated in FIGURE 3, wherein such passageways are formed by a drilling operation with plugs 65 being used to plug ends of the drilled holes and with sleeve inserts 67 and 68 being recessed in the casing halves to provide a passage through the clamped portions of the diaphragms 13 and 14, respectively.

The construction and mounting of the three-way pilot valve 59 is now described. The valve ports 58 and 64, as shown in FIGURES 4 and 6, are formed in blocks 70 and 71, respectively, within each of which there are communicating right-angle passageways and each being adjustably mounted by machine bolts 72 and 72, respectively, passing through elongated slots in the corresponding blocks and being threaded in the wall or partition 55, and with the blocks 70 and 71, as shown in FIGURE 6, being confined between parallelly extending guides or ribs 76, 77, 78 and 79 formed integrally with the wall 55. As shown in FIGURE 4, O-rings 80 and 81 are recessed within the wall or partition member 55 to provide a seal between the corresponding blocks 70 and 71 and the wall 55. The movable valve element 60 is also the movable armature of an electromagnet which is fulcrumed at 82 (FIGURE 6) on the pole piece 84 at the extremity of one leg of the U-shaped core member 85, the other leg terminating in pole piece 86. The movable valve element 60 or armature 60 is urged by coil compression spring 87 against the port 64, one end of spring 87 bearing on the armature 60 and the other end of spring 87 bearing on a stationary bracket member 90 which, as shown in FIGURES 11 and 1, is stationarily mounted on the wall member 55 by screw 92.

The legs of the U-shaped core member 85 extend through spool-shaped coil forms 94, 95 around which are correspondingly wound coils 96 and 97, these two coils being connected in series. This electromagnetic assembly is stationarily mounted on two rib members 100 (FIGURE 9) and 101 (FIGURE 1), each of which are notched as illustrated to receive respectively the legs and bent portion of the core member 85; and such assembly is maintained in such notched portions by the generally U-shaped clamping plate 46 secured to the wall 55 by a pair of fastening screws 107, 108.

As seen in FIGURE 1, an insulated cover member 112 forms a closure for the upper end of the casing part 12, the same being secured by cover screws 114 and carrying a pair of electrical terminals 115 to which lead wires 116 are fastened to interconnect terminals 115 with terminals 117 mounted on partition 55 as shown in FIGURE 9. The terminals 117 are both insulated from and sealingly mounted on the wall 55 using a ferrule 120 (FIG. 9) through which the threaded and shouldered post 122 extends. The post 122 has threaded thereon a clamping nut 124 which serves to press an interposed piece of insulating material 126 against partition 55 and which serves also to draw the shouldered portion of post 122 in sealing engagement with the ferrule 120 to thereby provide a sealed and insulated connection. The post 122 has slots at both of its ends forming soldering connections for the leads which are connected to the series-connected coils 96 and 97.

As alluded to previously, the various casing parts are clamped together and for that purpose the casing parts may have ears formed thereon through which fastening bolts 130 extend as illustrated in FIGURE 2.

Preferably, the interior of such casing parts 11, 12 are not true circles but are somewhat ovate in form, as illustrated in connection with FIGURE 5, which represent, as indicated, the effective area of either one of the diaphragms 13 or 14, it being noted that the inner line 132 lies on a true circule and that the four darkened portions spaced equal circumferential distances indicate the additional area of the diaphragm acted on by pressure as a result of the non-round interior of the casing parts. It is noted from FIGURE 5 that such increased areas are four in number and are each generally crescent-shaped. The advantages of this arrangement have been indicated in the objects to the specification.

If desired, as shown in FIGURE 1, a ring-shaped screen or filter 133 may be positioned within the inlet chamber 50 to surround the circular valve port 18.

In operation of the control, as shown in FIGURE 14, the coils 96, 97 of the electromagnetically operated pilot valve 59 are connectable to a source of voltage or current represented by source 140, through a condition-responsive switch 141. The source 140 may be the secondary winding of a transformer or a thermocouple or any other means for operation of the pilot valve 59. The switch 141 may be the switch of a thermostat which senses the heat or temperature produced as a result of the gas passing through the control and which is burned at a main burner connected to the outlet opening 16.

Normally, with the switch 141 in its open position as illustrated in FIGURE 14, the pilot valve 59 is in its condition illustrated in FIGURE 6, being held in such condition by the compression spring 87. Under this condition the diaphragm valves 18, 19 and 29, 36 are in their closed position as illustrated, being retained in such position by their corresponding springs 26 and 42. The diaphragms 13 and 14 are illustrated as having substantially the same effective areas and because of this particular construction, for achieving very important features of the present invention, the spring 42 exerts less force on its diaphragm 13 than does the spring 26 on its diaphragm 14, i.e. the spring 42 is weaker than the stronger spring 26. Under the conditions illustrated in FIGURE 1, the gas pressures on opposite sides of diaphragms 13 and 14 are balanced, this being so since gas pressure in the inlet chamber 50 and acting on the underside of diaphragm 14 is communicated to the topside of diaphragm 14 through a path which extends through a portion of passageway 57, through the open port 58 (FIGURE 4), to chamber 54 and through passageway 61 (FIGURE 10) to the chamber 52 which is defined in part by the topside of diaphragm 14. Also, under this condition the pressures on opposite sides of the diaphragm 13 are equal and opposite since the gas inlet pressure in chamber 50 is communicated to the chamber 53, i.e. to the underside of diaphragm 13 through passageway 57 and also to the topside of diaphragm 13, i.e. chamber 54, through the open pilot port 58 (FIGURE 4). Gas is thus prevented from escaping into the outlet chamber 51, i.e. to the main burner.

When the electromagnetically operated pilot valve 59 is energized, i.e. switch 141 in FIGURE 14 is closed, the combined armature and valve element 60 in FIGURE 6 is attracted to the pole piece 86, in which case the valve element 60 then closes port 58 and opens port 64, such port 64 being in communication with the passageway 62 which, as shown in FIGURE 8, is vented to the surrounding atmosphere through a restricted orifice 150 in disc 151 which is retained by an externally threaded ring 152 in the opening 153 in casing part 12. The topsides of diaphragms 13 and 14 are thus vented to the atmosphere through pilot port 64 and restricted orifice 150, in which case there is now a greater gas pressure acting on the underside of each of diaphragms 13 and 14. Also, it will be seen that such venting may be to the outlet chamber 51 in which case such venting is through a path which extends from port 64, through passageway 62 to outlet chamber 51. This differential pressure causes the diaphragm 13 to move upwardly, lifting its valve element 36 from seat 29 without, however, producing any appreciable upward movement of diaphragm 14, this being so since the spring 42 is weaker than the spring 26. Thus, a low fire condition is established with valve 29, 36 open and with valve 18, 19 closed, with gas flowing to the main burner through the following path: from the inlet chamber 50, through passageway 57, through the open valve 29, 36, through passageway 30, past the adjustable valve element 31, and through the passageway 62 to the outlet opening 51. The diaphragm 13 continues to rise until its motion is arrested by the cup-shaped spring retainer 40 contacting the stationary plate 43; and this latter condition corresponds to the fully open position of the low fire diaphragm 13. During such upward movement of the diaphragm 13, gas above the topside of diaphragm 13, i.e. in chamber 54, is displaced into the atmosphere through the now open pilot port 64 which is vented to the atmosphere through the restricted port 150 (FIGURE 8). In order for the diaphragm 14 to raise, gas in the chamber 52 is required to be displaced through the passageway 61 into the chamber 54 and such passageway 61 may be of such restricted nature acting in combination with the stronger spring 26 to achieve a time delay or pause prior to opening of valve 18, 19. The diaphragm 14 then continues to rise until its motion is arrested by engagement of the cup-shaped spring retainer 21 with the partition 28 and this latter condition corresponds to the fully open position of the high fire diaphragm 14. When valve 18, 19 is open, of course, then gas may escape directly from the inlet chamber 50 into the outlet chamber 51, i.e. to the main burner.

It will be seen from this description that the diaphragm valves 18, 19 and 29, 36 are in parallel flow paths between the inlet and outlet chambers 50 and 51 and that the flow of gas during the low fire condition may be adjusted by adjustment of the valve element 31. The passageway 30 is purposely made of smaller cross-sectional area than the cross-sectional area of the circular port 29 to obtain this effective adjustment during low fire.

When the electromagnet pilot valve 59 is de-energized, i.e. switch 141 is opened to allow pilot port 58 to be open and port 64 to be closed, full pressure is again communicated to the topsides of each of the diaphragms 13 and 14 to achieve relatively rapid closing of the diaphragm valves 18, 19 and 29, 36, this being so since during closing movement of the diaphragms 13 and 14 their undersides are being vented not only to the atmosphere through the restricted orifice 150 but also to the main burner.

It will be seen that the diaphragm valves 29, 36 and 18, 19 are operated sequentially in opening of the control and that the low fire valve 29, 36, upon opening, passes a copious amount of gas to achieve a so-called step action resulting in a large part from the fact that the area of the port 29 is larger than the cross-sectional area of the passageway 30 controlled by the valve element 31. It will also be noted that the initial start or low fire diaphragm 13 is allowed to travel or move further than necessary to achieve a low fire condition because of lower differential pressures required to move the diaphragm 13 against the action of the weaker spring 42. This movement, at the lower differential pressure, delays the subsequent opening of the main or high fire valve 18, 19, with the result that there is a pause or time delay after the initial low fire start. This pause lengthens the starting period and is particularly desirable in that respect.

It will be appreciated that means other than electrical means may be used to operate the pilot valve and such means may involve the use of a bimetal or thermal element as the valve actuator.

FIGURE 13 is a graph helpful in explaining further the manner in which the quantity of gas flow is controlled upon operation of the control.

FIGURE 13, the graph is plotted with abscissae representing time in seconds and the ordinates represent quantity of gas flow with the low fire and full fire conditions being illustrated. The time corresponding to zero time represents closing of the switch 141 in FIGURE 14 and the dotted vertical line 153 represents the time at which the pilot element 60 closes port 58. Shortly thereafter, the diaphragm valve 29, 36 opens at point A and ignition of the main burner flame occurs in the region between points A and B. The quantity of gas flowing in the regions between points C and D is relatively constant occasioned by the throttling or limiting action produced by the valve element 31. The time interval between points C and D thus represents a time lag or pause during which more favorable conditions may establish themselves at the burner and furnace. At point D, which may occur some 12 seconds after closure of switch 141, the other diaphragm valve 18, 19 starts to open and continues to open between the points D and E, at which latter point E the full fire condition is established. This may be approximately 25 seconds after closure of switch 141. Upon subsequent opening of switch 141, all gas flow to the main burner will shut off in approximately 1 or 2 seconds and can be accomplished in faster time depending upon the size of the pilot port 58 and connections thereto.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a fluid control of the character described, fluid inlet means for confining fluid under pressure, fluid outlet means, a first fluid path between said inlet means and outlet means, a first pressure-responsive diaphragm operated valve means in said first path, said diaphragm having a topside and a bottomside and being in said first path, a second fluid path between said inlet means and outlet means, a second pressure-responsive diaphragm operated valve means in said second path, said diaphragm of said second valve means having a topside and a bottomside and being in said second path, a three-way valve having a first port, a second port and a closure member movable between said first and second ports, fluid passageway means communicating said inlet means with the bottomside of the first mentioned diaphragm, with the bottomside of the second mentioned diaphragm and with one of said ports, second passageway means intercommunicating the topsides of each of said diaphragms, said control having a casing defining a chamber which is defined in part by the second mentioned diaphragm, said three-way valve being mounted in said chamber, said second passageway means communicating with said chamber, passageway means venting said second port to the atmosphere, the last mentioned passageway having a restricted opening therein, and passageway means extending from the last mentioned passageway means to said outlet means.

2. A control as set forth in claim 1 including adjustable valve means in said second path.

3. In a fluid control system wherein it is desired to establish initially a low fire condition and then a subsequent high fire condition at a burner and wherein a control is provided which has an inlet and an outlet with the outlet being connected to said burner, the combination comprising a pair of diaphragm valve means connected in parallel flow relationship between said inlet and outlet, means communicating one side of each of said diaphragm valve means with said inlet, joint control means effective alternatively either to communicate said inlet with the other side of each of said diaphragm valve means or to communicate said other side of each of said diaphragm valve means with the atmosphere to control movement of said diaphragm valve means, and means producing sequential operation of said valve means, the last mentioned means comprises a pair of springs of different strengths and wherein each of said diaphragms each have an equal effective area, one of said springs urging one of said diaphragm valve means towards its closed position and the other one of said springs urging the other one of said diaphragm valve means towards its closed position.

4. An arrangement as set forth in claim 3 including additional valve means connected in series flow relationship with one of said diaphragm valve means between said inlet and said outlet.

5. An arrangement as set forth in claim 4 in which such additional valve means is adjustable and has a port which is smaller in cross-sectional area than the port of that diaphragm valve means with which it is connected in series flow relationship.

6. In a fluid control valve, fluid inlet means for confining fluid under pressure, fluid outlet means, a small capacity path and a parallel-related large capacity path interconnecting said inlet and outlet means, first and second pressure responsive valve means in respective ones of said paths normally precluding the passage of fluid therethrough when subjected to the inlet fluid pressure, with the said first valve means being operable and the second valve means being inoperable when subjected to a first pressure value lower than said inlet pressure value, and with the said first and second valve means being operable when subjected to a second pressure value lower than said first pressure value; a chamber means common to both said valve means, and maintaining both said valve means in constant communication with each other and selectively operable control means for causing the said common chamber means to assume the said first and second pressure values sequentially to operate said valve means in the same sequence to first open the small capacity path and to thereafter open the large capacity path.

7. A fluid control valve as set forth in claim 6 wherein said first and second pressure responsive means includes diaphragm means, and wherein one side of each diaphragm means is in fluid communication with said inlet means and the other side of each diaphragm means is in constant fluid communication with said common chamber means.

8. A fluid control valve as set forth in claim 7 wherein the said diaphragms are of substantially equal effective area and wherein the said pressure-responsive valve means in response to said pressure values are controlled by spring means normally urging the said valve means in their closed position.

9. A fluid control valve as set forth in claim 6 wherein said small capacity path includes adjustable means serially related with said first pressure responsive valve means for variably restricting the fluid flow through the said small capacity path.

10. A fluid control valve as set forth in claim 6 wherein said control means includes means for changing the pressure in said common chamber means from inlet pressure to atmospheric pressure.

11. A fluid control valve as set forth in claim 10 wherein the interval between operation of said first and second pressure responsive valve means is related to the rate of change of pressure values in said common chamber means.

12. A fluid control valve as set forth in claim 11 wherein restoration of said control means returns the first and second pressure values in said common chamber means to equal said inlet pressure value and restores both said valve means in a time interval substantially shorter than the said operating time interval.

13. A fluid control valve as set forth in claim 6 wherein electromagnetic means are provided for operating the said control means.

References Cited by the Examiner

UNITED STATES PATENTS

| | | | |
|---|---|---|---|
| 955,531 | 4/1910 | Mueller | 251—121 X |
| 2,228,588 | 1/1941 | Ray | 158—123 |
| 2,314,266 | 3/1943 | Beam | 158—123 X |
| 2,410,876 | 11/1946 | Griswold | 137—110 |
| 2,526,069 | 10/1950 | Douglas | 137—599 X |
| 2,587,733 | 3/1952 | Jones. | |
| 2,610,680 | 9/1952 | Witzel | 158—131 |
| 2,808,068 | 10/1957 | Thomas | 137—110 |
| 2,872,972 | 2/1959 | Matthews | 158—131 X |
| 2,937,656 | 5/1960 | Evans et al. | 137—110 |
| 2,977,966 | 4/1961 | Matthews | 158—130 X |
| 2,988,279 | 6/1961 | Irwin | 137—599 |
| 2,993,510 | 7/1961 | Collins | 137—625.64 |

ISADOR WEIL, Primary Examiner.

FREDERICK C. MATTESON, WILLIAM F. O'DEA, Examiners.